US007274520B2

(12) United States Patent
Ferri et al.

(10) Patent No.: US 7,274,520 B2
(45) Date of Patent: Sep. 25, 2007

(54) MAGNIFICATION DEVICE FOR TIMEPIECE

(75) Inventors: Yvan Ferri, Lausanne (CH); Pascal Winkler, Saint-Blaise (CH)

(73) Assignee: The Swatch Group Management Services AG, Biel (CH)

( * ) Notice: Subject to any disclaimer, the term of this patent is extended or adjusted under 35 U.S.C. 154(b) by 0 days.

(21) Appl. No.: 11/246,526

(22) Filed: Oct. 11, 2005

(65) Prior Publication Data

US 2006/0077570 A1 Apr. 13, 2006

(30) Foreign Application Priority Data

Oct. 11, 2004 (CH) .................................... 1673/04

(51) Int. Cl.
*G02B 27/02* (2006.01)

(52) U.S. Cl. ........................ 359/802; 968/372; 73/1.43

(58) Field of Classification Search ................ 359/802; 968/372

See application file for complete search history.

(56) References Cited

U.S. PATENT DOCUMENTS

| | | | | |
|---|---|---|---|---|
| 3,939,646 | A * | 2/1976 | Uchiyama | 368/291 |
| 4,462,697 | A * | 7/1984 | Thompson | 368/282 |
| 5,440,428 | A * | 8/1995 | Hegg et al. | 359/630 |
| 6,406,769 | B1 | 6/2002 | Delabre | |
| 6,642,977 | B2 * | 11/2003 | Kotchick et al. | 349/96 |
| 2003/0189760 | A1 | 10/2003 | Miks et al. | |

FOREIGN PATENT DOCUMENTS

| | | |
|---|---|---|
| EP | 0 814 388 A1 | 12/1997 |
| JP | 61205889 | 9/1986 |
| JP | 62014083 | 1/1987 |

* cited by examiner

*Primary Examiner*—Ricky Mack
*Assistant Examiner*—Jessica T Stultz
(74) *Attorney, Agent, or Firm*—Griffin & Szipl, P.C.

(57) ABSTRACT

The device consists in compensating for the distortion of the characters marked on the dial caused by a lens, by writing the characters with a reverse pin cushion or barrel distortion.

5 Claims, 3 Drawing Sheets

MAGNIFICATION DEVICE FOR TIMEPIECE

This application claims priority from Swiss Patent Application No. 01673/04 filed Oct. 11, 2004, the entire disclosure of which is incorporated herein by reference.

FIELD OF THE INVENTION

The present invention concerns a magnification device for a timepiece that compensates, in a simple manner, the distortions in information that has to be read on a part of the dial through a magnifying lens.

BACKGROUND OF THE INVENTION

The information that generally appears in the form of alphanumerical characters on an LCD display, or in an aperture cut into the dial, to give complementary information to the current time, such as the date, the month or the day of the week, or even non time-related information such as the ON/OFF state of a function. In this latter case, this information is carried by discs or rings driven by the timepiece movement and are formed by successions of alphanumerical signs or pictograms of small dimensions, with the exception of course of "large date" devices, which have the drawback of relying on a bulkier, more complicated and therefore more expensive mechanism.

In order for the user to be able to read the displayed information better, designers have imagined for a long time placing a magnifying glass above the information to be read. By way of example, one can cite JP Patent No. 62014083 in which a convex lens is provided in the dial on an LCD display, said dial further comprising an analogue display using hands. In JP patent No 61205889, the magnifying device is formed by a magnifying ring formed in the external part of the crystal. The magnifying device can also be provided in the internal face of the crystal by adding a lens in a housing provided for this purpose, as disclosed in EP Patent No. 0 814 388 or by machining said lens in the internal face of the crystal, as disclosed for example in U.S. Pat. No. 6,406,769.

All of these magnifying devices magnify the information carried by the display, making it more visible, but necessarily induce distortions that may be more or less significant. It is known to correct such distortions, for example in cameras, using a stack of corrective lenses, as disclosed for example in US Patent No 2003/0189760. In a timepiece, given the small space available between the dial and the crystal and the probable occupation of such space by hands, it is not possible to envisage performing this optical correction by means of such a lens stack.

SUMMARY OF THE INVENTION

It is an object of the present invention to overcome the drawbacks of the aforecited prior art by providing an arrangement between the magnification means and the information to be read that removes, or at least greatly reduces, distortion, in a way, giving the information read the appearance that it would have without a magnification device.

The invention therefore concerns a device for magnifying alphanumerical characters or pictograms located on the dial of a timepiece by means of a single magnifying lens. The device is characterized in that the writing of the characters or pictogram is deformed in the opposite direction to the distortion caused by the lens such that the characters can be read without any deformation. Depending upon the geometrical and physical features of a lens, the type of distortion can be predicted, for example pin cushion and barrel distortion for a circular lens, and the lettering of the characters can be altered, such that the characters would appear deformed if not read through the lens.

The lens can be positioned on the dial, immediately above the characters, without disturbing rotation of the hands. It can also be positioned on the inner face or the outer face of the crystal.

As regards the alphanumerical characters that have to appear underneath the lens, they may be formed by means of a liquid crystal digital display (LCD), or more simply still, be marked on a date disc, and driven by the timepiece movement opposite an aperture. The information displayed in these apertures can be linked to the time or independent of the elapse of time, such as the ON/OFF state of a function integrated in the timepiece.

BRIEF DESCRIPTION OF THE DRAWINGS

Other features and advantages of the present invention will appear in the following description given by way of non-limiting illustration, with reference to the annexed drawings, in which.

DETAILED DESCRIPTION OF THE INVENTION

Figure 1:
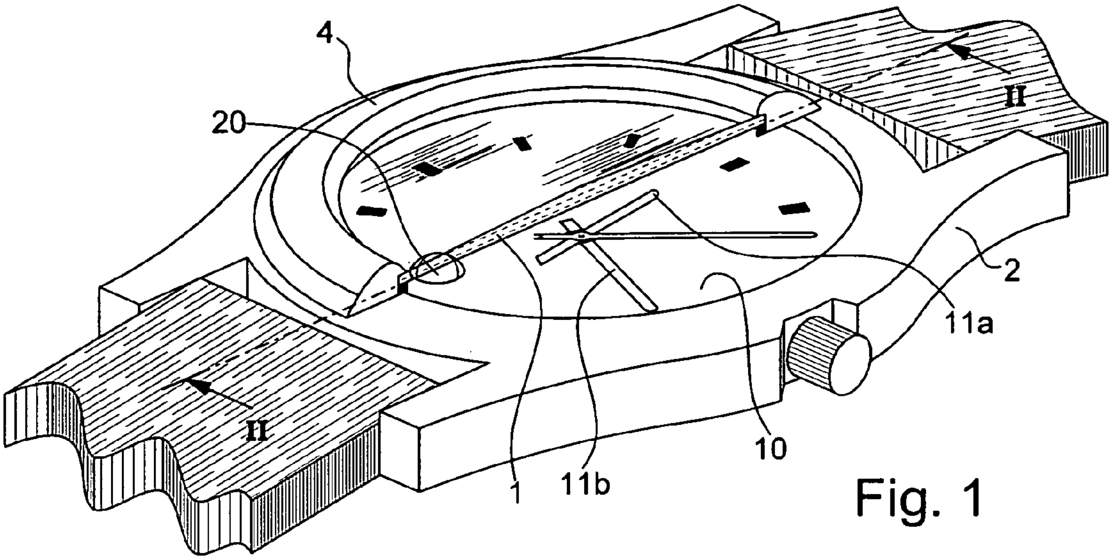
FIG. 1 is a partially torn away perspective diagram of an example embodiment of a magnification device according to the invention.
Figure 2:
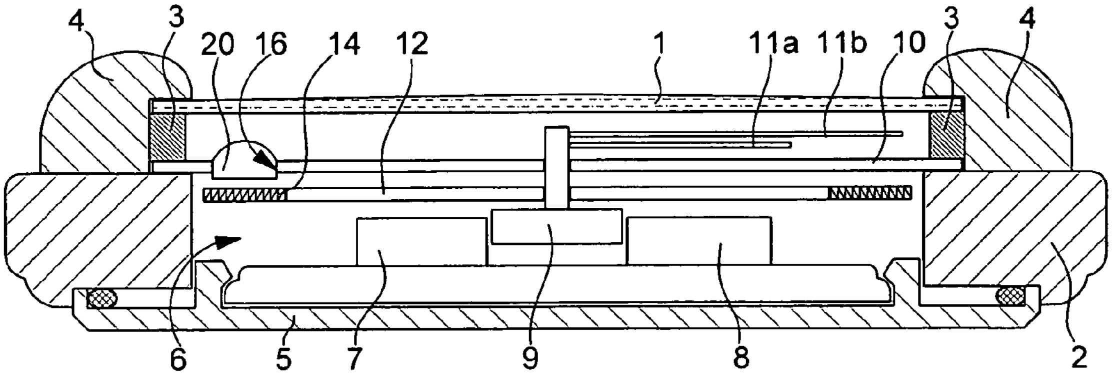
FIG. 2 is a diagonal cross-section along the arrows II-II of FIG. 1.

FIGS. 1 and 2 show by way of example a wristwatch comprising a magnification device according to the invention on its dial 10. Dial 10 is arranged in a circular case comprising a middle part 2 closed on its top part by a crystal 1 held between a flange 3 and a bezel 4, and on its bottom part by a back cover 5 delimiting a housing 6. Housing 6 is for receiving an energy source 7 used for powering the display control means 8. In this example control means 8 are formed by a time-keeping circuit provided for controlling a stepping motor 9 for driving hands 11*a*, 11*b* for reading the current time and a date disc 12, located underneath dial 10, on which are marked characters 14, which rotate past opposite an aperture 16 cut into dial 10. A magnifying lens 20 which cooperates with the manner in which characters 14 are written, as explained hereinafter by an embodiment example in the following Figures, is mounted on aperture 16.

Figure 3:
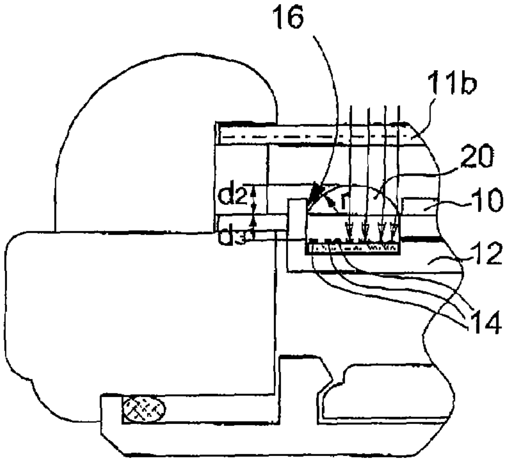
FIG. 3 is a partial enlarged view of the magnifying lens.

FIG. 3 is an enlarged cross-section of the magnifying lens 20 formed, in this example, by a plan-convex lens made of a material having a refractive index n , with a radius of curvature R=2.5 mm, a maximum thickness d2=2 mm and located at a distance d3=2 mm from characters 14 represented by the number 24. This type of lens induces a pin cushion distortion, the network of which is shown in FIG.

Figure 5:
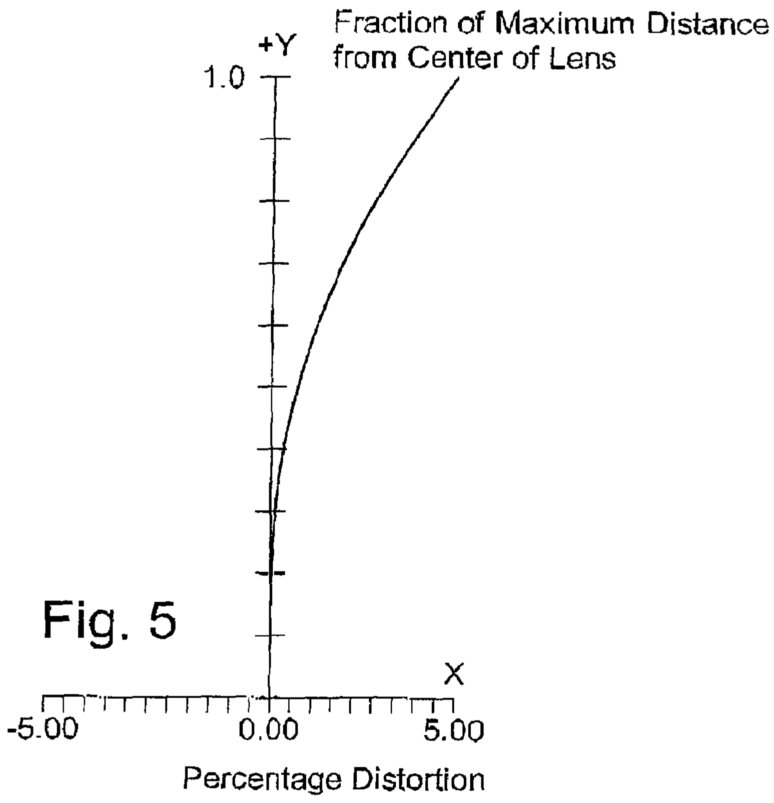
FIG. 5 is a distortion diagram of a lens having the features of that shown in FIG. 3.
Figure 6A:
FIGS. 6A and 6B show a number written in two ways, able to be read without any distortion through a lens, as shown in FIG. 7, and FIGS. 8A and 8B and respectively 9A and 9B, show two other letter distortion correction examples.

4A. FIG. 5 shows the distortion percentage along the X axis corresponding to the radial distance of an object point from the centre of the lens along the Y axis. The scale corresponds to 1/10 ths of the distance of the furthest object point. In order to compensate for this distortion, the number 24 is deformed in a barrel-like manner, as shown in FIG. 6A, from "reverse" distortion percentages that can be deduced from the diagram of FIG. 5, to appear without any deformation, as shown in FIG. 7.

Figure 4A:
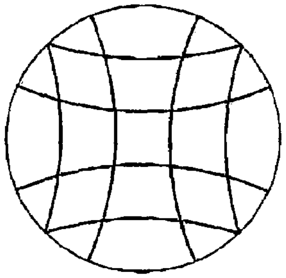
FIGS. 4A and 4B schematically show the deformations that can be observed with a magnifying lens.
Figure 4B:
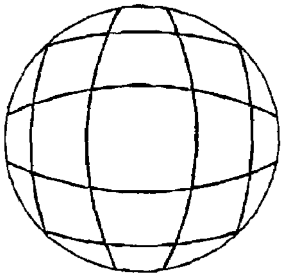
Figure 6B:
Figure 7:

With the same lens having different $d_2$, $d_3$ parameters, or with another lens causing barrel distortion of the number 24 (FIG. 4B), the number 24 has only to be written with "pin cushion" deformation, as shown in FIG. 6B, for the observer to see a non-deformed image, as shown in FIG. 7.

Figure 8A:
Figure 8B:
Figure 9A:
Figure 9B:

FIGS. 8A and 8B give another example with the letters FEB, for designating the month of February, deformed in a barrel-like manner (FIG. 8A) for a lens causing pin cushion distortion. The other example shown in FIGS. 9A and 9B concerns the letters MON for designating a day of the week, other information being able to be provided by the date disc.

As can be seen with the aforecited examples, no additional lens is necessary, since the optical distortion correction is obtained by the way the characters are written, i.e. in a very simple and economical manner, including for timepieces that are already being manufactured, for which the printing of the characters needs simply to be altered depending upon the features (n, R, d2, d3) of the magnifying lens 20.

It is clear that it would be entirely possible to transfer the example that has just been given to a lens located on the crystal, on the inner or outer face thereof, or to a digital liquid crystal display.

What is claimed is:

1. A device for magnifying alphanumerical characters or pictograms that have to be read on the dial of a timepiece, formed of a case closed by a crystal and a back cover and containing a timepiece movement, said magnification being obtained by means of a single magnifying lens, characterized wherein the writing of the characters is deformed in the opposite direction to the distortion caused by the lens.

2. The magnification device according to claim 1, wherein the lens is positioned on the dial immediately above the alphanumerical characters or pictograms.

3. The magnification device according to claim 1, wherein the lens is positioned on the crystal or formed in said crystal.

4. The magnification device according to claim 1, wherein the alphanumerical characters or pictograms are marked on a date disc driven by the timepiece movement opposite an aperture.

5. The magnification device according to claim 1, wherein the alphanumerical characters or pictograms are formed by a digital liquid crystal display.

* * * * *